United States Patent
Sato et al.

(10) Patent No.: US 11,401,435 B2
(45) Date of Patent: Aug. 2, 2022

(54) AQUEOUS PRIMER AND AQUEOUS WHITE INKJET INK COMPOSITION SET FOR LAMINATION

(71) Applicant: SAKATA INX CORPORATION, Osaka (JP)

(72) Inventors: Yoichi Sato, Osaka (JP); Kazuki Moriyasu, Osaka (JP); Eri Takahashi, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 280 days.

(21) Appl. No.: 16/771,574

(22) PCT Filed: Dec. 20, 2018

(86) PCT No.: PCT/JP2018/046895
§ 371 (c)(1),
(2) Date: Jun. 10, 2020

(87) PCT Pub. No.: WO2019/124473
PCT Pub. Date: Jun. 27, 2019

(65) Prior Publication Data
US 2020/0392360 A1    Dec. 17, 2020

(30) Foreign Application Priority Data

Dec. 21, 2017 (JP) .............................. JP2017-245612

(51) Int. Cl.
| | | |
|---|---|---|
| C09D 11/322 | (2014.01) | |
| C09D 11/54 | (2014.01) | |
| B41M 5/00 | (2006.01) | |
| C09D 11/00 | (2014.01) | |

(52) U.S. Cl.
CPC ........... C09D 11/54 (2013.01); B41M 5/0023 (2013.01); B41M 5/0047 (2013.01); B41M 5/0064 (2013.01); C09D 11/00 (2013.01); C09D 11/322 (2013.01)

(58) Field of Classification Search
CPC .... B41M 5/00; B41M 5/0023; B41M 5/0047; C09D 11/102; C09D 11/106; C09D 11/107; C09D 11/12; C09D 11/322; C09D 11/38; C09D 11/40; C09D 11/54
See application file for complete search history.

(56) References Cited

U.S. PATENT DOCUMENTS

| | | |
|---|---|---|
| 2013/0249996 A1 | 9/2013 | Saito et al. |
| 2016/0102220 A1 | 4/2016 | Kido et al. |

FOREIGN PATENT DOCUMENTS

| | | |
|---|---|---|
| JP | 2011105915 A | 6/2011 |
| JP | 2012251062 A | 12/2012 |
| JP | 2013194222 A | 9/2013 |
| JP | 2013199603 A | 10/2013 |
| JP | 2013230638 A | 11/2013 |
| JP | 2014065826 A | 4/2014 |
| JP | 2015183112 A | 10/2015 |
| JP | 2016079390 A | 5/2016 |
| JP | 2016193980 A | 11/2016 |
| JP | 2016196177 A | 11/2016 |
| JP | 2017008292 A | 1/2017 |
| JP | 2017088646 A | 5/2017 |
| WO | 2015068292 A1 | 5/2015 |

OTHER PUBLICATIONS

International Search Report (ISR) dated Mar. 19, 2019, issued for International application No. PCT/JP2018/046895. (2 pages).
Extended European Search Report (EESR) dated Aug. 20, 2021, issued for European counterpart patent application No. EP18892406.2 (6 pages).
Notification Concerning Transmittal of Copy of International Preliminary Report on Patentability (PCT/IB/326) and Notification of Transmittal of Copies of Translation of the International Preliminary Report on Patentability (PCT/IB/338) dated Jul. 2, 2020, with International Preliminary Report on Patentability (PCT/IB/373) and Written Opinion of the International Searching Authority (PCT/ISA/237), for corresponding international application PCT/JP2018/046895 (17 pages).
A Notice of Reasons for Refusal issued by the Japanese Patent Office dated Jun. 7, 2022, for Japanese counterpart application No. 2017-245612. (4 pages).

*Primary Examiner* — Anh T Vo
(74) *Attorney, Agent, or Firm* — Law Office of Katsuhiro Arai

(57) ABSTRACT

An object is to improve the lamination strength and antiblocking suitability of matters printed with an aqueous white inkjet ink composition containing titanium oxide, etc., on polyethylene terephthalate, polypropylene, nylon, and other resin films. As a means for achieving the object, an ink set is provided that includes a combination of: an aqueous primer composition containing an acrylic resin and/or vinyl acetate resin, and a calcium salt; and an aqueous white inkjet ink composition containing a polyester polyurethane resin emulsion with a rate of elongation of 500 to 1500% by 0.1 to 10.0 percent by mass in solids content in the aqueous white inkjet ink composition, a wax emulsion, and a titanium oxide.

6 Claims, No Drawings

AQUEOUS PRIMER AND AQUEOUS WHITE INKJET INK COMPOSITION SET FOR LAMINATION

CROSS-REFERENCE TO RELATED APPLICATIONS

This application is the U.S. National Phase under 35 U.S.C. § 371 of International Application PCT/JP2018/046895, filed December 20, 2018, which claims priority to Japanese Patent Application No. JP2017-245612, filed December 21, 2017. The International Application was published under PCT Article 21(2) in a language other than English.

TECHNICAL FIELD

The present invention relates to an aqueous primer and aqueous white inkjet ink composition set for lamination.

BACKGROUND ART

Aqueous white inkjet ink compositions for resin film printing are known; when printed on resin lamination films for food packaging, etc., however, these aqueous white inkjet ink compositions still exhibit low lamination suitability and lack of lamination strength. Lack of lamination strength may cause delamination between a layer constituted by such aqueous inkjet ink composition and a laminate layer or resin film.

Applying a primer containing calcium ions, etc., on a resin film before an aqueous inkjet ink composition is printed thereon is known, as described in Patent Literature 1.

Also known is an ink set consisting of two types of inks, one containing a reactive compound that has a specific functional group, and the other containing a compound that has a functional group reactive to the aforementioned functional group, wherein the two inks are printed one atop the other to permit lamination, as described in Patent Literature 2.

BACKGROUND ART LITERATURE

Patent Literature

Patent Literature 1: Japanese Patent Laid-open No. 2016-196177

Patent Literature 2: Japanese Patent Laid-open No. 2014-065826

SUMMARY OF THE INVENTION

Problems to be Solved by the Invention

The aforementioned invention described in Patent Literature 1 represents a primer and an inkjet ink composition, which are used only for printing on resin films and cannot be used for reverse printing, and furthermore they do not permit lamination afterward.

Also, the aforementioned invention described in Patent Literature 2, which involves a combination of inkjet ink compositions for lamination, is nothing more than printing two types of inks one atop the other without using any primer.

In other words, aqueous inkjet ink compositions for lamination are yet to achieve improved lamination suitability, etc., through combined use with specific primer compositions.

Accordingly, an object of the present invention is to improve the lamination strength and anti-blocking suitability of matters printed with an aqueous white inkjet ink composition containing titanium oxide, etc., on polyethylene terephthalate, polypropylene, nylon, and other resin films.

Means for Solving the Problems

After studying in earnest to achieve the aforementioned object, the inventors of the present invention found that the object could be achieved by using an ink set combining a primer of specific composition and an aqueous white inkjet ink composition of specific composition, and eventually completed the present invention as follows.

1. An ink set that includes a combination of:
    an aqueous primer composition containing an acrylic resin and/or vinyl acetate resin, and a calcium salt; and
    an aqueous white inkjet ink composition containing a polyester polyurethane resin emulsion with a rate of elongation of 500 to 1500% by 0.1 to 10.0 percent by mass in solids content in the aqueous white inkjet ink composition, a wax emulsion, and a titanium oxide.
2. The ink set according to 1, wherein the aqueous primer composition contains a chlorinated polyolefin.
3. The ink set according to 1 or 2, which is for resin films.
4. A resin film for packaging bags, constituted by, as formed on one side of the resin film for packaging bags in this order:
    a layer containing an acrylic resin and/or vinyl acetate resin, and a calcium salt; and
    a white printed layer containing a polyester polyurethane resin with a rate of elongation of 500 to 1500% by 0.5 to 50.0 percent by mass, an acrylic resin, a wax, and a titanium oxide.
5. A resin film for packaging bags, constituted by, as formed on one side of the resin film for packaging bags in this order:
    a layer containing an acrylic resin and/or vinyl acetate resin, and a calcium salt;
    a printed layer having colors other than white; and
    a white printed layer containing a polyester polyurethane resin with a rate of elongation of 500 to 1500% by 0.5 to 50.0 percent by mass, an acrylic resin, a wax, and a titanium oxide.

Effects of the Invention

The aqueous white inkjet ink composition under the present invention offers excellent preservation stability and discharge stability and, once printed on the surface of a polypropylene, polyethylene terephthalate, or other resin film, it also achieves improved lamination strength of the printed surface with respect to a resin film.

MODE FOR CARRYING OUT THE INVENTION

<Aqueous Primer Composition>

The aqueous primer composition under the present invention can be obtained by mixing the following components by an arbitrary means.

(Acrylic Resin)

The acrylic resin under the present invention is compounded in an emulsion or aqueous solution form. This acrylic resin is a resin constituted by polymerizing the following monomers, such as: (meth)acrylic acid, maleic acid, and other unsaturated carboxylic acids; methyl (meth) acrylate, ethyl (meth)acrylate, propyl (meth)acrylate, butyl (meth)acrylate, hexyl (meth)acrylate, 2-ethylhexyl (meth) acrylate, lauryl (meth)acrylate, myristyl (meth)acrylate, cetyl (meth)acrylate, stearyl (meth)acrylate, oleyl (meth) acrylate, eicosyl (meth)acrylate, and other (meth)acrylate esters having aliphatic hydrocarbon groups; 2-hydroxymethyl (meth)acrylate, 2-hydroxyethyl (meth)acrylate, 2-hydroxypropyl (meth)acrylate, 3-hydroxypropyl (meth)acrylate, and other (meth)acrylate ester compounds having hydroxy alkyl groups; (meth)acryl amide; acrylonitrile; olefin compounds, etc.; styrene, α-methyl styrene, vinyl toluene, dimethyl styrene, ethyl styrene, isopropyl styrene, t-butyl styrene, chlorostyrene, dichlorostyrene, bromostyrene, fluorostyrene, styrene, and other styrene monomers; benzyl (meth)acrylate and other benzyl (meth)acrylate monomers; and phenyl (meth)acrylate and other phenyl (meth)acrylate monomers. Any such acrylic resin may be used alone, or two or more types may be used in combination.

Regarding the acrylic resin, its glass transition temperature (Tg) is preferably −30 to 120° C., weight-average molecular weight is preferably 3,000 to 50,000, and acid value is preferably 30 to 500 mgKOH/g.

Preferably the compounding quantity of the acrylic resin in the primer composition is 1.0 to 20.0 percent by mass in solids content.

(Vinyl Acetate Resin)

The vinyl acetate resin under the present invention is compounded in an emulsion or aqueous solution form. This vinyl acetate resin is a resin in which a vinyl acetate monomer accounts for 50 percent by mol or more. For the vinyl acetate resin, a vinyl acetate homopolymer, or a copolymer of vinyl acetate and ethylene, propylene, vinyl chloride, vinylidene chloride, vinyl fluoride, or other halogenated vinyl, methyl (meth)acrylate, ethyl (meth)acrylate, propyl (meth)acrylate, butyl (meth)acrylate, hexyl (meth) acrylate, 2-ethylhexyl (meth)acrylate, or other alkyl (meth) acrylate ester, (meth)acrylic acid, maleic acid, fumaric acid, crotonic acid, or other carboxyl group-containing monomer or anhydride thereof, etc., may be adopted, where, if necessary, partial or complete saponification is implemented.

Preferably the weight-average molecular weight of the vinyl acetate resin is 3,000 to 50,000, while preferably the compounding quantity of the vinyl acetate resin in the primer composition is 1.0 to 20.0 percent by mass in solids content.

(Calcium Salt)

The calcium salt may be a calcium salt of either an organic acid or inorganic acid. Specific preferred examples of organic acids include those having a fatty acid anion RCOO— where the carbon number of R is 1 or greater but no greater than 30. Such fatty acids include acetic acid, propionic acid, octylic acid, lauric acid, myristic acid, pentadecylic acid, palmitic acid, margaric acid, stearic acid, 12-hydroxy stearic acid, ricinoleic acid, oleic acid, vaccenic acid, linoleic acid, linolenic acid, arachidic acid, behenic acid, lignoceric acid, cerotic acid, montanic acid, melissic acid, etc. Among the foregoing, more preferred are those with the carbon number of R being 1 or greater but no greater than 10, while even more preferred are those with the carbon number of R being 1 or greater but no greater than 5, in the fatty acid anion RCOO—. Such fatty acids include acetic acid, and the like.

Meanwhile, preferred calcium salts of inorganic acids include calcium salts of hydrochloric acid, nitric acid, sulfuric acid, phosphoric acid, etc., among which calcium salts of hydrochloric acid and nitric acid are more preferred.

The additive quantity of the calcium salt relative to the entire primer composition is 0.3 to 5.0 percent by mass. Adjusting its additive quantity in this range allows for prompt agglutination of the aqueous inkjet ink composition formed on the primer layer. And, the result is that the primer layer and the aqueous inkjet ink composition layer can be laminated more closely to each other.

(Chlorinated Polyolefin)

A chlorinated polyolefin that can be used under the present invention is compounded in an emulsion form into a primer. The polyolefin used as the material thereof is not limited in any way, but examples include crystalline polypropylene, amorphous polypropylene, ethylene-propylene copolymer, ethylene-propylene-diene copolymer, ethylene-propylene-α-olefin copolymer, propylene-α-olefin copolymer, ethylene-vinyl acetate copolymer, etc.

It should be noted that polyvinyl chloride need not be included.

The content of the chlorinated polyolefin in the composition under the present invention is preferably 0.2 percent by mass or higher, or more preferably 0.3 to 20.0 percent by mass, or yet more preferably 1.5 to 15.0 percent by mass. If the content is lower than 0.2 percent by mass, the adhesion property of the primer composition with respect to the base material may drop.

The ethylene-propylene-α-olefin copolymer, and the propylene-α-olefin copolymer, are each a resin obtained by copolymerization of an ethylene-propylene or propylene as a primary component, with an α-olefin. The type of copolymer is not limited in any way, and examples include block copolymer and random copolymer, and the like. Examples of α-olefin components include ethylene, 1-butene, 1-pentene, 1-hexene, 1-heptene, 1-octene, 4-methyl-1-pentene, etc. It should be noted that, if a propylene-α-olefin copolymer is used as the material, preferably the content of the propylene component is 50 percent by mol or higher from the viewpoint of adhesion property with respect to polyolefin resins that constitute printing targets.

An ethylene-vinyl acetate copolymer is a resin obtained by copolymerization of ethylene and vinyl acetate monomers. Although the mol ratio of ethylene and vinyl acetate in the ethylene-vinyl acetate copolymer is not limited in any way, preferably the vinyl acetate component accounts for 5 to 45 percent by mol from the viewpoints of bonding property with respect to polar substances, and of coating film strength.

The polyolefin resin used as the material of the chlorinated polyolefin under the present invention may be one type of polyolefin used alone, or a combination of two or more types. Also, the melting point of the polyolefin resin is preferably 100 to 180° C., or more preferably 120 to 170° C.

The degree of chlorination of the chlorinated polyolefin under the present invention is normally 10 to 50, or preferably 15 to 40, or more preferably 20 to 30, or yet more preferably 20 to 25. When the degree of chlorination is 10 to 50, good adherability with respect to polyolefin base materials can be maintained. The chlorine content is a value measured according to JIS-K7229.

Although the weight-average molecular weight of the chlorinated polyolefin under the present invention is not limited in any way, it is preferably 3,000 to 200,000. When the weight-average molecular weight is 3,000 or greater, good agglutinability and adhesion property to the base material, of the chlorinated polyolefin, can be maintained. When it is 200,000 or smaller, good compatibility with monofunctional monomers can be maintained.

It should be noted that the weight-average molecular weight of the chlorinated polyolefin under the present invention is a value based on polystyrene resin as measured by gel permeation chromatography (GPC).

Normally a stabilizer is added to the chlorinated polyolefin. An example of stabilizer is an epoxy compound. Although the epoxy compound is not limited in any way, an epoxy compound compatible with chlorinated resins is preferred. Examples of epoxy compounds include compounds whose epoxy equivalent weight is approx. 100 to 500 and which has one or more epoxy groups per molecule. Epoxy compounds include the following compounds, for example: epoxidated vegetable oils obtained by epoxidizing vegetable oils having natural unsaturated groups with peracetic acid or other peroxy acid (epoxidated soybean oil, epoxidated flaxseed oil, etc.); epoxidated fatty acid esters obtained by epoxidating oleic acid, fatty acid of tall oil, fatty acid of soybean oil, or other unsaturated fatty acid; epoxidated tetrahydrophthalate and other epoxidated alicyclic compounds; ethers obtained by condensing bisphenol A or polyalcohols with epichlorohydrin, including bisphenol A glycidyl ether, ethylene glycol glycidyl ether, propylene glycol glycidyl ether, glycerol polyglycidyl ether, and sorbitol polyglycidyl ether, for example; and monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenol polyethylene oxide glycidyl ether, etc. Other examples of stabilizers include stabilizers used for polyvinyl chloride resins. Furthermore, such stabilizers include calcium stearate, lead stearate and other metal soaps, dibutyltin dilaurate, dibutyl maleate, and other organic metal compounds, and hydrotalcite compounds. One type of stabilizer may be used alone, or two or more types may be combined. If a stabilizer is added, preferably its additive quantity is 1.0 to 20.0 percent by weight (in equivalent solids content) relative to the chlorinated polyolefin.

The chlorinated polyolefin under the present invention may be an acid-denatured chlorinated polyolefin to which an α or ß-unsaturated carboxylic acid and/or derivative thereof has been introduced. Such α and ß-unsaturated carboxylic acids and derivatives thereof include, for example, maleic acid, maleic acid anhydride, fumaric acid, citraconic acid, citraconic acid anhydride, mesaconic acid, itaconic acid, itaconic acid anhydride, aconitic acid, aconitic acid anhydride, himic acid anhydride, (meth)acrylic acid, (meth) acrylic acid ester, etc. The introduction quantity of the α or ß-unsaturated carboxylic acid and/or derivatives thereof, although not limited in any way, is preferably 0 to 20.0 percent by weight, or more preferably 0 to 10.0 percent by weight, relative to 100 percent by weight of the chlorinated polyolefin.

(Other Components)

Water-soluble solvents, waxes, preservatives, silicone-fluorine surface-active agents, crosslinking agents, plasticizers, neutralizing pH adjusting agents, etc., may be compounded into the aqueous primer composition under the present invention.

<Aqueous White Inkjet Ink Composition>

The aqueous white inkjet ink composition under the present invention, which forms a white printed layer, is obtained by preparing a white base ink beforehand and then compounding it with a polyester polyurethane resin emulsion, a wax emulsion, a surface-active agent, water, and a water-soluble organic solvent, as described below.

(White Base Ink)

A white base ink may be obtained by compounding a white pigment or other pigment into a resin varnish primarily constituted by an aqueous solution of acrylic resin, so that it is contained by 10.0 to 50.0 percent by mass in the white base ink, and further compounding water and a water-soluble organic solvent.

(Polyester Polyurethane Resin Emulsion)

The polyester polyurethane resin emulsion must have a rate of elongation of 500 to 1500%, and is compounded into the aqueous white inkjet ink composition in an emulsion form. If the rate of elongation is below 500% or exceeds 1500%, lamination strength with respect to PET (polyethylene terephthalate) films will drop.

Additionally, the solids concentration of the polyester polyurethane resin emulsion in the aqueous white inkjet ink composition under the present invention is 0.1 to 10.0 percent by mass, or preferably 3.0 to 7.0 percent by mass in order to improve each effect in a balanced manner. If this concentration is below 0.1 percent by mass, lamination strength with respect to oriented polypropylene and PET films will drop; if it exceeds 10.0 percent by mass, on the other hand, preservation stability and discharge stability will drop.

Also, the concentration of solids derived from the polyester polyurethane resin emulsion in the dry coating film constituted by the aqueous white inkjet ink composition must be 0.5 to 50.0 percent by mass in the coating film that has dried. If this concentration is below 0.5 percent by mass, lamination strength with respect to oriented polypropylene and PET films will drop; on the other hand, an aqueous white inkjet ink composition with this concentration exceeding 50.0 percent by mass will have poor preservation stability and discharge stability.

For the rate of elongation of the polyester polyurethane resin emulsion under the present invention, the value calculated using the formula below based on the results of measuring, under the conditions of 20 mm in tensile tester gauge length and 100 mm/min in pulling speed, a coating film of 500 μm in film thickness obtained by drying the polyester polyurethane resin emulsion at room temperature for 15 hours as preliminary drying, and then drying it under the conditions of 80° C. for 6 hours and 120° C. for 20 minutes as main drying, may be adopted.

(Length of the coating film just before the surface of the coating film ruptures/Length prior to the tensile test)×100 (%)

Such polyester polyurethane may be either an aliphatic polyester polyurethane resin emulsion or aromatic polyester polyurethane resin emulsion.

For the polyester used as the material of the polyester polyurethane, a polyester obtained from the following may be adopted, for example: adipic acid, azelaic acid, sebacic acid, suberic acid, and other aliphatic acids; phthalic acid, phthalic acid anhydride, isophthalic acid, dimethyl isophthalic acid, terephthalic acid, dimethyl terephthalic acid, and other aromatic acids; trimellitic acid, tetrahydrophthalic acid anhydride, maleic acid, maleic acid anhydride, fumaric acid, and other polybasic acids; and ethylene glycol, propylene glycol, 1,3-butylene glycol, 1,4-butylene glycol, dimethyl propane diol, 3-methyl-1,5-pentane diol, 1,6-hexane diol, octane diol, neopentyl glycol, cyclohexane dimethanol, diethylene glycol, dipropylene glycol, and other diols or glycols.

Additionally, lactone polyester polyols, such as poly-γ-butyrolactone, poly-ε-caprolactone, and other polyester polyols by ring-opening polymerization, obtained by using a glycol as an initiator, as well as poly(hexamethylene carbonate) diol and other polycarbonate ester diols, may also be used as a polyester.

The diisocyanate compound used as the material of the polyester polyurethane may be, for example: tolylene diisocyanate, diphenyl methane diisocyanate, or other aromatic diisocyanate compound; lysine isocyanate, hexamethylene diisocyanate, or other aliphatic diisocyanate compound; isophorone diisocyanate, xylylene diisocyanate, 1,3-bis(isocyanatomethyl) cyclohexane, dicyclohexyl methane diisocyanate, tetramethyl xylylene diisocyanate, or other non-yellowing diisocyanate compound; or dimer acid diisocyanate.

Furthermore, to obtain the polyester polyurethane, the following may be adopted as a chain extender: ethylene glycol, propylene glycol, butylene glycol, dimethyl propane diol, hexane diol, methyl pentane diol, octane diol, neopentyl glycol, cyclohexane dimethanol, diethylene glycol, dipropylene glycol, or other glycol; glycerin, trimethylol propane, or other triol; or ethylene diamine, propylene diamine, hexamethylene diamine, hydrazine or hydrazine derivative compound, piperazine or piperazine compound, diaminodicyclohexyl methane, diphenyl methane diamine, xylene diamine, isophorone diamine, or other amine compound.

While the polyester polyurethane is obtained from the aforementioned materials using any conventionally known methods, it may be obtained, for example, by preparing a prepolymer with a terminal NCO in an organic solvent from the aforementioned polyester polyol of 500 to 5,000 in molecular weight and containing a terminal OH group, and from an isocyanate compound, and then polymerizing the obtained prepolymer using a chain extender.

And, the weight-average molecular weight of the polyester polyurethane is preferably 10,000 to 200,000, or more preferably 50,000 to 100,000, in the case of an aromatic polyester polyurethane, or preferably 10,000 to 300,000, or more preferably 50,000 to 200,000, in the case of an aliphatic polyester polyurethane.

For such polyester polyurethane, SUPERFLEX 740 (anionic, average grain size 0.20 μm, minimum film forming temperature 5° C. or below, degree of elongation 1300%), SUPERFLEX 500M (nonionic, average grain size 0.14 μm, minimum film forming temperature 5° C. or below, degree of elongation 1100%), SUPERFLEX 840, or IMPRANIL DL1380, may be used.

Among urethane resin emulsions, use of polyether polyurethane resin emulsions and polycarbonate polyurethane resin emulsions, for example, will result in lower lamination strength with respect to PET films.

Also, compounding an acrylic resin emulsion in place of the polyester polyurethane under the present invention will result in lower lamination strength with respect to oriented polypropylene or PET films. For this reason, the probability that it is better not to include an acrylic resin emulsion even when a polyester polyurethane is included is high.

(Wax Emulsion)

Preferably the aqueous white inkjet ink composition under the present invention further contains a wax emulsion.

The wax emulsion has the effect of improving the anti-blocking property of printed matters.

Such wax emulsion is preferably an emulsion of paraffin wax or polyethylene wax, or more preferably a paraffin wax emulsion. A specific example of paraffin wax emulsion is AQUACER 539 (manufactured by BYK Additives and Instruments). As polyethylene wax emulsion, AQUACER 507, AQUACER 515, AQUACER 531 (all manufactured by BYK Additives and Instruments), HITECH E-6314 (solids content 35%, nonionic emulsified polyethylene wax emulsion, manufactured by Toho Chemical Industry Co., Ltd.), HITECH E-1000 (solids content 35%, nonionic emulsified polyethylene wax emulsion, manufactured by Toho Chemical Industry Co., Ltd.), etc. can be listed. Any of these may be used alone, or two or more types may be used in combination.

(Acetylene Diol Surface-Active Agent)

A compound having an acetylene diol skeleton may be compounded, as an acetylene diol surface-active agent, into the aqueous white inkjet ink composition under the present invention. Doing so has the effect of achieving good solid filling property for images printed (recorded) with the aqueous inkjet ink composition under the present invention.

Specific examples of the acetylene diol surface-active agent include SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, and SURFYNOL 465, manufactured by Air Products and Chemicals, Inc.; OLFIN E1004, OLFIN E1010, OLFIN E1020, OLFIN PD-001, OLFIN PD-002W, OLFIN PD-004, OLFIN PD-005, OLFIN EXP. 4001, OLFIN EXP. 4200, OLFIN EXP. 4123, and OLFIN EXP. 4300, manufactured by Nissin Chemical Industry Co., Ltd.; and the like. Any of these may be used alone, or two or more types may be used in combination.

(Water-Soluble Organic Solvent)

The following water-soluble organic solvents may be compounded into the aqueous white inkjet ink composition under the present invention.

Methanol, ethanol, n-propanol, n-butanol, n-pentanol, n-hexanol, n-heptanol, n-octanol, n-nonyl alcohol, n-decanol, and isomers thereof; cyclopentanol, cyclohexanol, and other monoalcohols; ethylene glycol, diethylene glycol, triethylene glycol, propylene glycol, dipropylene glycol, tripropylene glycol, butane diol, 1,5-pentane diol, 1,2-pentane diol, 1,6-hexane diol, heptane diol, 1,2-cyclohexane diol, octane diol, 1,9-nonane diol, 1,10-decane diol, and other diols; tetraethylene glycol, polyethylene glycol, tetrapropylene glycol, thiodiglycol, etc.; monoalkyl esters, monoalkyl ethers, and dialkyl ethers of the foregoing alcohols; and glycerins.

Acetone, methyl ethyl ketone, methyl butyl ketone, methyl isobutyl ketone, diisopropyl ketone, cyclopentanone, cyclohexanone, and other ketones.

Isopropyl ether, n-butyl ether, tetrahydrofuran, tetrahydropyran, 1,4-dioxane, and other ethers.

Propylene carbonate, methyl acetate, ethyl acetate, propyl acetate, isopropyl acetate, butyl acetate, isobutyl acetate, amyl acetate, ethyl lactate, ethyl butyrate, dibutyl phthalate, dioctyl phthalate, and other esters; and ε-caprolactone, ε-caprolactam, and other cyclic esters, etc.

Examples of the aforementioned nitrogen-containing compound include urea, pyrrolidone, N-methyl-2-pyrrolidone, octyl pyrrolidone, etc.

One or more types of these water-soluble organic solvents are used, and when a water-soluble organic solvent or solvents is/are compounded, it is done in such a way that the water-soluble organic solvent(s) will account for 10.0 to 60.0 percent by mass, or more preferably 20.0 to 50.0 percent by mass, or yet more preferably 20.0 to 40.0 percent by mass, in the aqueous white inkjet ink composition.

(Pigment)

For the pigment with which to constitute the aqueous white inkjet ink composition under the present invention, titanium oxide, zinc flower, zinc oxide, barium sulfate, calcium carbonate, or other white pigment conventionally used in white ink compositions may be used.

As for the content of the white pigment in the aqueous white inkjet ink composition, any value may be selected arbitrarily in consideration of the desired degree of whiteness, concealing property, etc.; however, preferably it falls between 1.0 and 15.0 percent by mass.

It should be noted that, to adjust the hue, etc., of white color, any other conventionally known pigment may be used in combination, to the extent that the resulting color is considered white.

Specific examples of conventionally known inorganic pigments include carbon black, lithopone, iron oxide, aluminum oxide, silicon dioxide, kaolinite, montmorillonite, talc, silica, alumina, cadmium red, red iron oxide, molybdenum red, chrome vermillion, molybdate orange, lead yellow, chrome yellow, cadmium yellow, yellow iron oxide, titan yellow, chrome oxide, viridian, cobalt green, titan cobalt green, cobalt chrome green, ultramarine, ultramarine blue, Prussian blue, cobalt blue, cerulean blue, manganese violet, cobalt violet, mica, etc.

Specific examples of organic pigments include azo-, azomethine-, polyazo-, phthalocyanine-, quinacridone-, anthraquinone-, indigo-, thioindigo-, quinophthalone-, benzimidazolone-, isoindoline-, isoindolinone-type, and other organic pigments; where specific examples according to the color index are Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

(Pigment Dispersant)

Next, for the pigment dispersant with which to constitute the aqueous white inkjet ink composition under the present invention, any known pigment dispersant may be used. A pigment dispersant has both a group affinitive to pigments and a group affinitive to solvents, etc.

Under the present invention, preferably the group affinitive to solvents, etc., is a resin, such as acrylic resin, styrene acrylic resin, maleic acid resin, styrene maleic acid resin, α-olefin maleic acid resin, urethane resin, ester resin, etc., for example. From the viewpoint of stabilizing the pigment dispersion, preferably an acrylic resin, and a styrene-lauroyl acrylate-acrylic acid copolymer or other styrene acrylic resin is used.

For the group affinitive to pigments, a group having a structure or structure/polarity close to those of the pigments is used, such as carboxyl group, amino group, etc.

(Acrylic Resin)

An acrylic resin other than the acrylic resin used in the aforementioned pigment dispersant, regardless of whether it is derived from an aqueous resin varnish or not, may be compounded in an emulsion or aqueous solution form into the aqueous white inkjet ink composition under the present invention. This acrylic resin may be obtained by polymerizing monomers that are similar to the monomers constituting the acrylic resin being compounded into the aforementioned aqueous primer composition.

Any of these acrylic resins may be used alone, or two or more types may be used in combination; however, the compounding of acrylic resin(s) must not impair the effects of the present invention.

The use quantity of the acrylic resin is preferably 0.2 to 5.0 percent by mass, or more preferably 0.8 to 4.0 percent by mass, or yet more preferably 1.0 to 2.0 percent by mass, relative to the total quantity of the aqueous white inkjet ink composition.

If the total use quantity of the acrylic resin is lower than 0.2 percent by mass, not only will the fixability to the base material become insufficient, but bleeding may also occur; if it exceeds 5.0 percent by mass, on the other hand, the solids content will increase excessively and the discharge stability may drop.

It should be noted that, to the extent that these performances do not drop, a resin that dissolves in an aqueous solution or water-soluble organic solvent, other than the aforementioned acrylic resin, may be used in combination, such as vinyl chloride resin, vinyl chloride-vinyl acetate resin, ethylene-vinyl acetate resin, styrene-acrylic resin, styrene-maleic acid resin, cellulose resin, maleic acid resin, etc.

(Other Components)

Additionally, other resins may be added, as necessary, to the aqueous white inkjet ink composition under the present invention to the extent that doing so does not impair the effects of the present invention, and furthermore acetylene and other surface-active agents, plasticizers, surface-adjusting agents, UV protective agents, photostabilizers, antioxidants, and various other additives may be used.

Also, adipic acid hydrazide or other hydrazine derivative having at least two hydrazine groups may be added. This can improve the adhesion property of a coating film constituted by the aqueous white inkjet ink composition, to a film surface on which hydroxyl groups or other polar groups have been formed by corona discharge treatment, plasma treatment, etc., based on the reaction between the polar groups and the hydrazide groups.

(Manufacturing of Aqueous White Inkjet Ink Composition)

Next, how the aqueous white inkjet ink composition under the present invention is manufactured using these materials is explained.

The aqueous white inkjet ink composition under the present invention may be obtained through separate dispersion and mixing operations in a step to obtain a white pigment base ink, and in a step to obtain an aqueous white inkjet ink composition, using, for example, a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE 2000, etc.), pearl mill, or other dispersion machine.

It should be noted that, as an ink set, aqueous inkjet ink compositions of different colors may be provided. Yellow, magenta, cyan, black, as well as green, purple, etc., and also lighter versions of these colors, may be provided, as necessary.

<How to Use Aqueous White Inkjet Ink Composition>

The aqueous white inkjet ink composition under the present invention can be printed solid, or used for non-solid printing, on resin films.

Furthermore, it may be used as an inkjet ink composition that constitutes an ink set. The method for use in this application is as follows, for example.

The aqueous primer composition is applied by any given printing means or application means over the entire surface, or a part thereof, of one side of a resin film with which to constitute a bag-shaped package container, etc., and then dried.

Inkjet printing is performed on the obtained primer layer with any given device using aqueous inkjet ink compositions of colors other than white. For multi-color printing, an aqueous inkjet ink composition in each color is used in any given order for inkjet printing. This is followed by inkjet printing with any given device using the aqueous white inkjet ink composition.

Next, a resin film that will become the interior face of the packaging container is laminated over the layer of the white aqueous inkjet ink composition, by sandwiching an adhesive layer in between, if necessary.

The obtained laminate film is processed into a bag, etc., by any given means.

EXAMPLES

The present invention is explained in greater detail below by citing examples; however, the present invention is not limited to these examples. It should be noted that, unless otherwise specified, "%" refers to "percent by mass," while "part" refers to "part by mass."

<Aqueous Resin Varnish>

Twenty parts by mass of an acrylic acid/n-butyl acrylate/benzyl methacrylate/styrene copolymer with a glass transition temperature of 40° C., weight-average molecular weight of 30,000 and acid value of 185 mgKOH/g were dissolved in a mixed solution of potassium hydroxide accounting for 2.5 parts by mass and water accounting for 77.5 parts by mass, to obtain an aqueous resin varnish of 20% in solids content.

<Preparation of White Pigment Base Ink>

Twenty parts by mass of water were mixed into 40.0 parts by mass of the aforementioned aqueous resin varnish, to prepare a resin varnish for pigment dispersion. To this varnish, 40.0 parts by mass of a titanium oxide (product name: R-960, manufactured by DuPont de Nemours, Inc.) were further added and mixed under agitation, followed by kneading in a wet circulation mill, to prepare a white pigment base ink.

Various pigment base inks were used, according to the blending ratios shown in Table 2, to prepare the aqueous white inkjet ink compositions in Examples 1 to 6 and Comparative Examples 1 to 8.

<Surface-Active Agent>

SURFYNOL 465 (Active ingredient 100%, HLB13, manufactured by Air Products and Chemicals, Inc.)

<Resin Emulsions>

IMPRANIL DL1380 (Polyester urethane emulsion, manufactured by Sumika Covestro Urethane Co., Ltd.)

SUPERFLEX 740 (Polyester urethane emulsion, manufactured by DKS Co. Ltd.)

SUPERFLEX 500M (Polyester urethane emulsion, manufactured by DKS Co. Ltd.)

SUPERFLEX 840 (Polyester urethane emulsion, manufactured by DKS Co. Ltd.)

SUPERFLEX 210 (Polyester urethane emulsion, manufactured by DKS Co. Ltd.)

IMPRANIL DLP-R (Polyester urethane emulsion, manufactured by Sumika Covestro Urethane Co., Ltd.)

SUPERFLEX 130 (Polyether urethane emulsion, manufactured by DKS Co. Ltd.)

SUPERFLEX 460 (Polycarbonate urethane emulsion, manufactured by DKS Co. Ltd.)

YODOSOL AD137 (Acrylic emulsion, manufactured by Henkel Japan Ltd.)

<Wax Emulsion>

AQUACER 539 (Solids content 35%, manufactured by BYK Additives and Instruments)

<Printing Evaluation of Aqueous White Inkjet Ink Composition>

(Preservation Stability)

The aqueous white inkjet ink compositions in Examples 1 to 6 and Comparative Examples 1 to 8 shown in Table 2 were filled in glass vials and kept stationary for seven days at 60° C., after which the aqueous white inkjet ink compositions were measured for viscosity to evaluate their preservation stability.

Evaluation Criteria

○: The rate of change from the initial viscosity is lower than 10%.

Δ: The rate of change from the initial viscosity is 10% or higher, but lower than 15%.

×: The rate of change from the initial viscosity is 15% or higher.

(Discharge Stability)

The aqueous white inkjet ink compositions in Examples 1 to 6 and Comparative Examples 1 to 8 were printed on photo paper <glossy> (manufactured by Seiko Epson Corporation) using an Epson printer PX105, to evaluate their discharge stability.

Evaluation Criteria

○: There are no printing irregularities and the ink can be discharged stably.

Δ: There are some printing irregularities but the ink can be discharged.

×: There are printing irregularities and the ink cannot be discharged stably.

(Anti-Blocking Property)

The treated sides of polyethylene terephthalate films (manufactured by Toyobo Co., Ltd., E-5102, thickness 12 μm, hereinafter referred to as PET films) that had been treated on one side by corona discharge, or the treated sides of biaxially oriented polypropylene films (product name: PYLEN P-2161, thickness 25 μm, manufactured by Toyobo Co., Ltd., hereinafter referred to as OPP films) that had been treated on one side by corona discharge, were coated with a primer and then printed with the ink compositions in Examples 1 to 6 and Comparative Examples 1 to 8 charged in the cartridges of an Epson printer PX105, after which the films were stacked with the printed side and the back side facing each other and pressed with a pressure of 9.8×104 Pa (1 kgf/cm$^2$). The films were let stand for 24 hours and then peeled, to evaluate anti-blocking property.

○: The print coating film does not peel at all.

×: The print coating film peels and strong peel resistance is felt.

(Lamination Strength: Dry Lamination Method)

The aforementioned PET films and OPP films were coated with the primer shown in Table 1 and the resulting primer layers were printed with the aqueous white inkjet ink compositions in Examples 1 to 6 and Comparative Examples 1 to 8 charged in the cartridges of an Epson printer PX105, after which the printed layers were coated with an isocyanate adhesive (manufactured by Takeda Pharmaceutical Co., Ltd., TAKENATE A-385/TAKELAC A-50 ethyl acetate solution) and laminated by a CPP film using a dry laminator, to obtain laminated products. These dry laminated products were kept for three days at 40° C., and then cut into 15-mm wide thin strips as samples and measured for T-peel strength using a peel tester manufactured by Yasuda Seiki Seisakusho, Ltd.

Evaluation Criteria

○: The peel strength is 100 g/15 mm width or higher.

Δ: The peel strength is 50 g/15 mm width or higher, but lower than 100 g/15 mm width.

×: The peel strength is lower than 50 g/15 mm width.

TABLE 1

| | |
|---|---|
| Calcium acetate | 5 |
| Chlorinated polyolefin emulsion (solids content) | 2 |
| Acrylic emulsion | 2 |
| SURFYNOL 465 | 0.5 |
| Water | 90.5 |
| Total | 100 |

TABLE 2

| | | Rate of elongation | Examples | | | | | |
|---|---|---|---|---|---|---|---|---|
| | | | 1 | 2 | 3 | 4 | 5 | 6 |
| Water-based pigment base ink (Pig = 40%) | | — | 25 | 25 | 25 | 25 | 25 | 25 |
| Water-soluble solvent | Propylene glycol | — | 30 | 25 | 20 | 25 | 25 | 25 |
| Polyester polyurethane resin emulsion (solids content) | IMPRANIL DL1380 | 1500% | 1 | 5 | 10 | — | — | — |
| | SUPERFLEX 740 | 1300% | — | — | — | 5 | — | — |
| | SUPERFLEX 500M | 1100% | — | — | — | — | 5 | — |
| | SUPERFLEX 840 | 690% | — | — | — | — | — | 5 |
| | SUPERFLEX 210 | 5% | — | — | — | — | — | — |
| | IMPRANIL DLP-R | 1600% | — | — | — | — | — | — |
| Polyether polyurethane resin emulsion (solids content) | SUPERFLEX 130 | 6% | — | — | — | — | — | — |
| Polycarbonate polyurethane resin emulsion (solids content) | SUPERFLEX 460 | 750% | — | — | — | — | — | — |
| Acrylic emulsion (solids content) | YODOSOL AD137 | — | — | — | — | — | — | — |
| Wax emulsion (solids content) | AQUACER 539 | — | 2 | 2 | 2 | 2 | 2 | 2 |
| Surface-active agent | SURFYNOL 465 | — | 1 | 1 | 1 | 1 | 1 | 1 |
| Water | | | 41 | 42 | 42 | 42 | 42 | 42 |
| Total | | | 100 | 100 | 100 | 100 | 100 | 100 |
| Preservation stability | | | ○ | ○ | Δ | ○ | ○ | ○ |
| Discharge stability | | | ○ | ○ | Δ | ○ | ○ | ○ |
| Anti-blocking property | | | ○ | ○ | ○ | ○ | ○ | ○ |
| OPP lamination strength (g/15 mm) | | | Δ | ○ | ○ | ○ | ○ | ○ |
| PET lamination strength (g/15 mm) | | | Δ | ○ | ○ | ○ | ○ | ○ |

| | | Rate of elongation | Comparative Examples | | | | | | | |
|---|---|---|---|---|---|---|---|---|---|---|
| | | | 1 | 2 | 3 | 4 | 5 | 6 | 7 | 8 |
| Water-based pigment base ink (Pig = 40%) | | — | 25 | 25 | 25 | 25 | 25 | 25 | 25 | 25 |
| Water-soluble solvent | Propylene glycol | — | 31 | 15 | 25 | 25 | 25 | 25 | 25 | 25 |
| Polyester polyurethane resin emulsion (solids content) | IMPRANIL DL1380 | 1500% | — | 15 | — | — | — | — | — | 5 |
| | SUPERFLEX 740 | 1300% | — | — | — | — | — | — | — | — |
| | SUPERFLEX 500M | 1100% | — | — | — | — | — | — | — | — |
| | SUPERFLEX 840 | 690% | — | — | — | — | — | — | — | — |
| | SUPERFLEX 210 | 5% | — | — | 5 | — | — | — | — | — |
| | IMPRANIL DLP-R | 1600% | — | — | — | 5 | — | — | — | — |
| Polyether polyurethane resin emulsion (solids content) | SUPERFLEX 130 | 6% | — | — | — | — | 5 | — | — | — |
| Polycarbonate polyurethane resin emulsion (solids content) | SUPERFLEX 460 | 750% | — | — | — | — | — | 5 | — | — |
| Acrylic emulsion (solids content) | YODOSOL AD137 | — | — | — | — | — | — | — | 5 | — |
| Wax emulsion (solids content) | AQUACER 539 | — | 2 | 2 | 2 | 2 | 2 | 2 | 2 | — |
| Surface-active agent | SURFYNOL 465 | — | 1 | 1 | 1 | 1 | 1 | 1 | 1 | 1 |
| Water | | | 41 | 42 | 42 | 42 | 42 | 42 | 42 | 44 |
| Total | | | 100 | 100 | 100 | 100 | 100 | 100 | 100 | 100 |
| Preservation stability | | | ○ | X | ○ | ○ | ○ | ○ | ○ | ○ |

TABLE 2-continued

| | | | | | | | | |
|---|---|---|---|---|---|---|---|---|
| Discharge stability | O | X | O | O | O | O | O | O |
| Anti-blocking property | O | O | O | O | O | O | O | X |
| OPP lamination strength (g/15 mm) | X | O | O | O | O | Δ | X | O |
| PET lamination strength (g/15 mm) | X | O | X | X | X | X | X | O |

The Examples based on the present invention exhibited excellent preservation stability, discharge stability, anti-blocking property, and lamination strength.

On the other hand, Comparative Examples 1 and 7 that did not use any polyester polyurethane resin emulsion, resulted in poor lamination strength with respect to OPP and PET films. Also, Comparative Example 2 in which a polyester polyurethane resin emulsion was compounded excessively, demonstrated poor preservation stability and discharge stability.

Furthermore, Comparative Examples 3 and 4 that used a polyester polyurethane resin emulsion whose rate of elongation was outside the scope of the present invention, as well as Comparative Examples 5 and 6 in which a polyurethane resin emulsion was added but in the form of a polyether polyurethane resin emulsion and a polycarbonate polyurethane resin emulsion, respectively, exhibited poor lamination strength with respect to PET films. Also, Comparative Example 8 that used a polyester polyurethane resin emulsion whose rate of elongation was inside the scope of the present invention, but did not use any wax emulsion, resulted in poor anti-blocking property.

What is claimed is:

1. An ink set that includes a combination of:
   an aqueous primer composition containing an acrylic resin and/or vinyl acetate resin, and a calcium salt; and
   an aqueous white inkjet ink composition containing a polyester polyurethane resin emulsion with a rate of elongation of 500 to 1500% by 0.1 to 10.0 percent by mass in solids content in the aqueous white inkjet ink composition, a wax emulsion, and a titanium oxide.

2. The ink set according to claim 1, wherein the aqueous primer composition contains a chlorinated polyolefin.

3. The ink set according to claim 1, which is for resin films.

4. The ink set according to claim 2, which is for resin films.

5. A resin film for packaging bags, constituted by, as formed on one side of the resin film for packaging bags in this order:
   a layer containing an acrylic resin and/or vinyl acetate resin, and a calcium salt; and
   a white printed layer containing a polyester polyurethane resin with a rate of elongation of 500 to 1500% by 0.5 to 50.0 percent by mass, an acrylic resin, a wax, and a titanium oxide.

6. A resin film for packaging bags, constituted by, as formed on one side of the resin film for packaging bag in this order:
   a layer containing an acrylic resin and/or vinyl acetate resin, and a calcium salt;
   a printed layer having colors other than white; and
   a white printed layer containing a polyester polyurethane resin with a rate of elongation of 500 to 1500% by 0.5 to 50.0 percent by mass, an acrylic resin, a wax, and a titanium oxide.

* * * * *